US011151595B1

(12) United States Patent
Maheswari et al.

(10) Patent No.: US 11,151,595 B1
(45) Date of Patent: Oct. 19, 2021

(54) SYSTEM, METHOD, AND COMPUTER PROGRAM FOR A SMART COUPON CODE

(71) Applicant: Amdocs Development Limited, Limassol (CY)

(72) Inventors: Yogesh Maheswari, Pune (IN); Dinesh Kumar Mohapatra, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 202 days.

(21) Appl. No.: 16/443,567

(22) Filed: Jun. 17, 2019

(51) Int. Cl.
*G06Q 30/02* (2012.01)

(52) U.S. Cl.
CPC ..... *G06Q 30/0235* (2013.01); *G06Q 30/0222* (2013.01); *G06Q 30/0225* (2013.01); *G06Q 30/0239* (2013.01)

(58) Field of Classification Search
CPC ............... G06Q 30/02; G06Q 30/0235; G06Q 30/0222; G06Q 30/0225; G06Q 30/0239
See application file for complete search history.

(56) References Cited

U.S. PATENT DOCUMENTS

| | | | | |
|---|---|---|---|---|
| 6,073,112 | A * | 6/2000 | Geerlings | G06Q 30/02 |
| | | | | 705/14.53 |
| 6,298,329 | B1 * | 10/2001 | Walker | G06Q 30/0225 |
| | | | | 705/14.26 |
| 6,493,110 | B1 * | 12/2002 | Roberts | G06K 7/10851 |
| | | | | 235/462.01 |
| 6,594,637 | B1 * | 7/2003 | Furukawa | G06Q 10/063116 |
| | | | | 705/7.16 |
| 7,240,843 | B2 * | 7/2007 | Paul | G06Q 20/341 |
| | | | | 235/472.01 |
| 8,046,257 | B2 * | 10/2011 | Wane | G06Q 20/10 |
| | | | | 705/14.38 |
| 8,840,032 | B2 * | 9/2014 | Lindahl | G06Q 30/0207 |
| | | | | 235/494 |
| 10,997,622 | B2 * | 5/2021 | Awad | G06Q 20/387 |
| | (Continued) | | | |

FOREIGN PATENT DOCUMENTS

| | | |
|---|---|---|
| WO | 33044711 A1 | 5/2003 |
| WO | 2013047534 A1 | 4/2013 |
| WO | 2014111731 A1 | 7/2014 |

OTHER PUBLICATIONS

Stallings, W., "Cryptography and Network Security: Principles and Practice," 6th ed. Prentice Hall, 2014, pp. 1-731.

(Continued)

*Primary Examiner* — Thuy N Nguyen
(74) *Attorney, Agent, or Firm* — Zilka-Kotab, P.C.

(57) ABSTRACT

A system, method, and non-transitory computer readable medium are provided for a smart coupon code. The smart coupon code is generated by receiving input that includes: a coupon discount for a purchasable item, a date range during which the coupon discount is valid, and one or more customer segments for which the coupon discount is valid, and further generated the smart coupon code, based on the input, to include an indication of: the coupon discount for the purchasable item, the date range during which the coupon discount is valid, and the one or more customer segments for which the coupon discount is valid. The smart coupon code can additionally validated against a requested purchase transaction based on the information indicated therein.

11 Claims, 9 Drawing Sheets

(56) References Cited

U.S. PATENT DOCUMENTS

| | | | |
|---|---|---|---|
| 2004/0117250 A1* | 6/2004 | Lubow | G06Q 30/0215 705/14.17 |
| 2005/0240478 A1* | 10/2005 | Lubow | G06Q 30/0238 705/14.17 |
| 2006/0167753 A1* | 7/2006 | Teague | G06Q 30/02 705/14.26 |
| 2011/0302018 A1 | 12/2011 | Norcross et al. | |
| 2012/0016766 A1* | 1/2012 | Raizada | G06Q 20/085 705/26.25 |
| 2013/0091002 A1* | 4/2013 | Christie | G06Q 30/02 705/14.26 |
| 2013/0211890 A1* | 8/2013 | Heitmueller | G06Q 20/387 705/14.13 |
| 2013/0325575 A1* | 12/2013 | Byrd | G06Q 30/02 705/14.23 |
| 2014/0214514 A1* | 7/2014 | Rector | G06Q 30/0238 705/14.26 |
| 2016/0335655 A1* | 11/2016 | Hansen | G06Q 30/0225 |
| 2018/0315066 A1* | 11/2018 | Heitmueller | G06Q 20/387 |
| 2019/0352167 A1* | 11/2019 | Rehfuss | G06Q 30/0248 |
| 2020/0082426 A1* | 3/2020 | Awad | H04L 9/0825 |

OTHER PUBLICATIONS

Cormen et al., "Introduction to Algorithms," 3rd ed., MIT Press, 2009, pp. 253-280.
Wong, D., "Smart Strategies for Issuing Ecommerce Coupons," Huffpost, Sep. 29, 2015, retrieved from https://www.huffingtonpost.com/danny-wong/smart-strategies-for-issu_b_8196662.html, 6 pages.
Wong, D., "Smart Strategies for Issuing Ecommerce Coupons," Conversio, Sep. 17, 2015, retrieved from https://conversio.com/academy/smart-strategies-for-issuing-ecommerce-coupons/, 15 pages.
Friedlein, J., "How important are Voucher codes for ecommerce?" Smart Insights, Feb. 6, 2015, retrieved from https://www.smartinsights.com/affiliate-marketing/affiliate-marketing-strategy/voucher-codes-ecommerce/, 10 pages.

* cited by examiner

401 Customer segment (S) is modelled as S = {v1, v2, v3 ..., vn} where, v1, v2 ..., vn = individual elements of segment. Assuming that m set of element is configured S(i) is
$$S^i = \{v1^i, v2^i, v3^i, ..., vn^i\}$$
where (i) ranges from 1 to m
(m = total number of Customer Segments configured)

---

402 A Date Range (D) is modelled as D={S, E} where, S = Start Date time and E = End Date time. Assuming that n is the set of different date range is configured $D^j$
$$D^j = \{S, E\}$$
where (j) is from 1 to n dates

403 An coupon value (CV) that contains the mapping of discount type – fixed or percentage, and corresponding discount value. Assuming that P is set of different coupon Value, then
$$CV^k = \{voucher\ amount\}$$
where k is from 1 to p

---

404 Mapping process is done to map a segment, date and amount element
$$M^U = S^X, D^Y, CV^Z$$
Where
$S^x$ = x segment configuration from a list of m
$D^y$ = y date range configuration from a list of n
$CV^z$ = Coupon Value configuration from a list of p
U = 1 to total of Z different configuration that needs Coupon codes

---

405 Generate Smart Coupon Code algorithm(GSCC) that does three different activity for each $M^U$
1. GenerateSegmentHashCode(GSC), GSC = Segment from $M^U$
2. GenerateDateRangeCode(GDC), GDC = DateRange from $M^U$
3. GenerateCouponValue(GCV), GCV = coupon value from $M^U$
4. GenerateFinalOutput(GFO)

---

406 GenerateSegmentCode(GSC), creates an hash output based on the Segment($S^x$). The output of the hashing is a fixed length Alphanumeric code(SC), that represents the segment based on the defined build block element of each constituent from the Customer Segment.
SC = GenerateSegmentHashCode(GSC)

---

407 GenerateDateRangeCode(GDC), processes DateRange($D^y$) such that the output is the startDate and the offset to decode the enddate
DC = GenerateDateRangeCode(GDC)

---

408 GenerateCouponValue(GCV), processes Coupon Value($CV^u$) such that the output is discount type and discount value concatenated.
TV = GenerateCouponValue(GCV)

---

409 GenerateFinalOutput(GFO), it creates a Smart code by combining the following in a predefined format the predefined format is encrypted, the output of which is SMART COUPON ("GSC"):
GSC = Encript(SC + DC + TV)

Loop U = 1 to Z, Z is total number of mappings

SYSTEM, METHOD, AND COMPUTER PROGRAM FOR A SMART COUPON CODE

FIELD OF THE INVENTION

The present invention relates to coupons, and in particular computer generated coupon codes.

BACKGROUND

To promote digital sales on eCommerce platforms, a discount offered through a coupon code is a very strong marketing technique. Over the years, use of the coupon code has become all pervasive. Typically, when a coupon code is attempted to be used by a customer during an online purchase transaction, the coupon code is validated against a database or hardcoded logic and is then applied to the purchase once validated.

However, a database validation of the coupon code requires calls to the database, and therefore has a runtime overhead of the database transaction processing during the online transaction. On the other hand, a hardcoding coupon processing logic lacks the principles of a dynamic system behavior, increases the time to market for the coupon code, and makes the coupon processing system very expensive with changes to the point that system stability becomes more concerning than promoting eCommerce sales. While the above traditional approaches may enable use of coupon codes, there are clearly limitations to these approaches.

There is thus a need for addressing these and/or other issues associated with the prior art.

SUMMARY

As described herein, a system, method, and non-transitory computer readable medium are provided for a smart coupon code. In an embodiment, the smart coupon code is generated. In particular, input is received, the input including: a coupon discount for a purchasable item, a date range during which the coupon discount is valid, and one or more customer segments for which the coupon discount is valid. Additionally, the smart coupon code is generated, based on the input, to include an indication of: the coupon discount for the purchasable item, the date range during which the coupon discount is valid, and the one or more customer segments for which the coupon discount is valid.

In another embodiment, the smart coupon code is processed. In particular, the smart coupon code is received as input in association with a customer request for a purchase transaction. Additionally, information is extracted from the smart coupon code, the information indicating: a coupon discount for a purchasable item, a date range during which the coupon discount is valid, and one or more customer segments for which the coupon discount is valid. Further, the smart coupon code is validated against the purchase transaction, using the extracted information. Still yet, the coupon discount is applied to the purchase transaction, based on the validation.

BRIEF DESCRIPTION OF THE DRAWINGS

FIG. 4 shows method for generating a smart coupon code, in accordance with the smart coupon code system of FIG. 3.

DETAILED DESCRIPTION

Figure 1:
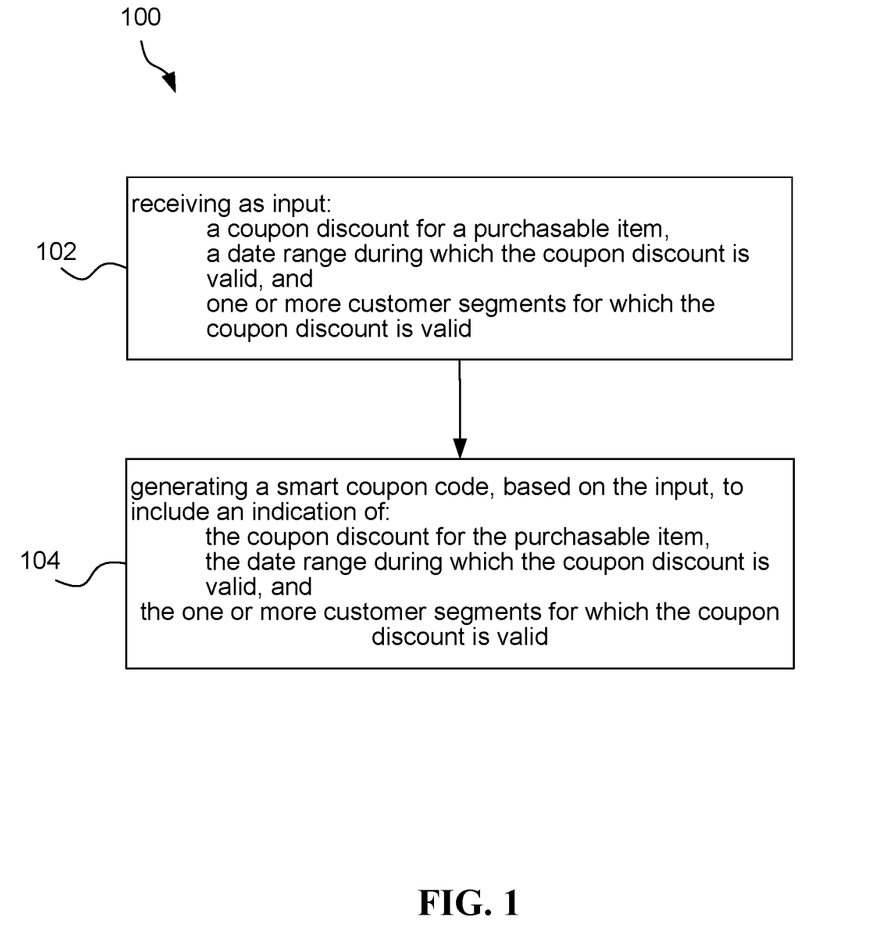
FIG. 1 illustrates a method for generating a smart coupon code, in accordance with an embodiment.

FIG. 1 illustrates a method 100 for generating a smart coupon code, in accordance with an embodiment. The method 100 may be implemented in the context of any computer system, such as the exemplary system 900 of FIG. 9. In an embodiment, the method 100 may be implemented by a computer system executing a smart coupon manager application (described below) to generate the smart coupon code.

In operation 102, input is received. The input may be received by a user, in an embodiment. For example, the user may enter the input into a graphical user interface (GUI) of the smart coupon manager application. The user may be an eCommerce marketer responsible for defining coupons providing discounts for items purchasable through an eCommerce website.

In the context of the present embodiment, the input includes a coupon discount for a purchasable item. In the context of the present description, the coupon discount refers to any benefit provided to a customer as a result of use of the smart coupon code in association with a purchase transaction. For example, the coupon discount may be a monetary reduction of a published purchase price of the purchasable item, and thus may be a percentage amount or a fixed amount. As another example, the coupon discount may be a physical or digital payment or gift.

Additionally, in the context of the present embodiment, the input includes a date range during which the coupon discount is valid. The date range may be defined as the time frame between (and optionally including) a start date or time and end date or time. Of course, the date range may include multiple non-contiguous time frames, as an option. The validity of the coupon discount refers to the applicability of the coupon discount to a particular purchase transaction, as will be described in more detail below.

Further, in the context of the present embodiment, the input includes one or more customer segments for which the coupon discount is valid. Thus, the input may include one customer segment or multiple customer segments. Again, the validity of the coupon discount refers to the applicability of the coupon discount to a particular purchase transaction, as will be described in more detail below.

In the context of the present description, a customer segment refers to a defined group of one or more customers having a particular set of characteristics (attribute values). In an embodiment, each customer segment includes one or more segment attributes (e.g. customer type such as new or existing, customer location, customer zip code, customer job type, etc.). As an option, each customer segment may include a value for every predefined segment attribute in a list of predefined segment attributes. The values may optionally be selected from a list of predefined values per segment attribute. To leave one of the segment attributes unspecified for a particular customer segment, the value of ALL may be used for that segment attribute. As a further option, the customer segment may define a particular customer (e.g. by name or other unique identifier).

In operation 104, a smart coupon code is generated, based on the input. In the context of the present embodiment, the smart coupon code is generated to indicate the coupon discount for the purchasable item, the date range during which the coupon discount is valid, and the one or more customer segments for which the coupon discount is valid. To this end, the smart coupon code may include the information required to determine whether the coupon discount is valid for a particular purchase transaction, such that the validity of the smart coupon code can be determined during an eCommerce flow for a requested purchase transaction without requiring back-end database calls to determine the validity.

In one embodiment, the smart coupon code may be generated to include the input itself. In another embodiment, the input may be stored in a data structure, and the smart coupon code may be generated to include an index, pointer, etc. to the stored input.

In yet another embodiment, the input may be transformed during, or prior to, generating the smart coupon code to form transformed input. For example, the input may be transformed to a format amenable to being used to generate the smart coupon code. As an option, transforming of the one or more customer segments may include converting the one or more customer segments to a hash value. As another option, transforming the date range may include converting the date range to offset and reference values. As yet another embodiment, transforming the coupon discount may include converting the coupon discount to an alphanumeric code. With respect to this embodiment, the smart coupon code may be generated to include the transformed input.

In another embodiment, the input may be encrypted during, or prior to, generating the smart coupon code to form encrypted input. As an option, the transformed input described above may be encrypted during, or prior to, generating the smart coupon code to form the encrypted input. The encryption may be provided using a symmetric or asymmetric encryption process that yields a corresponding decryption key for use when processing the smart coupon code in association with a purchase transaction, as described below. With respect to this embodiment, the smart coupon code may be generated based on the encrypted input (e.g. to include the encrypted input).

Figure 2:
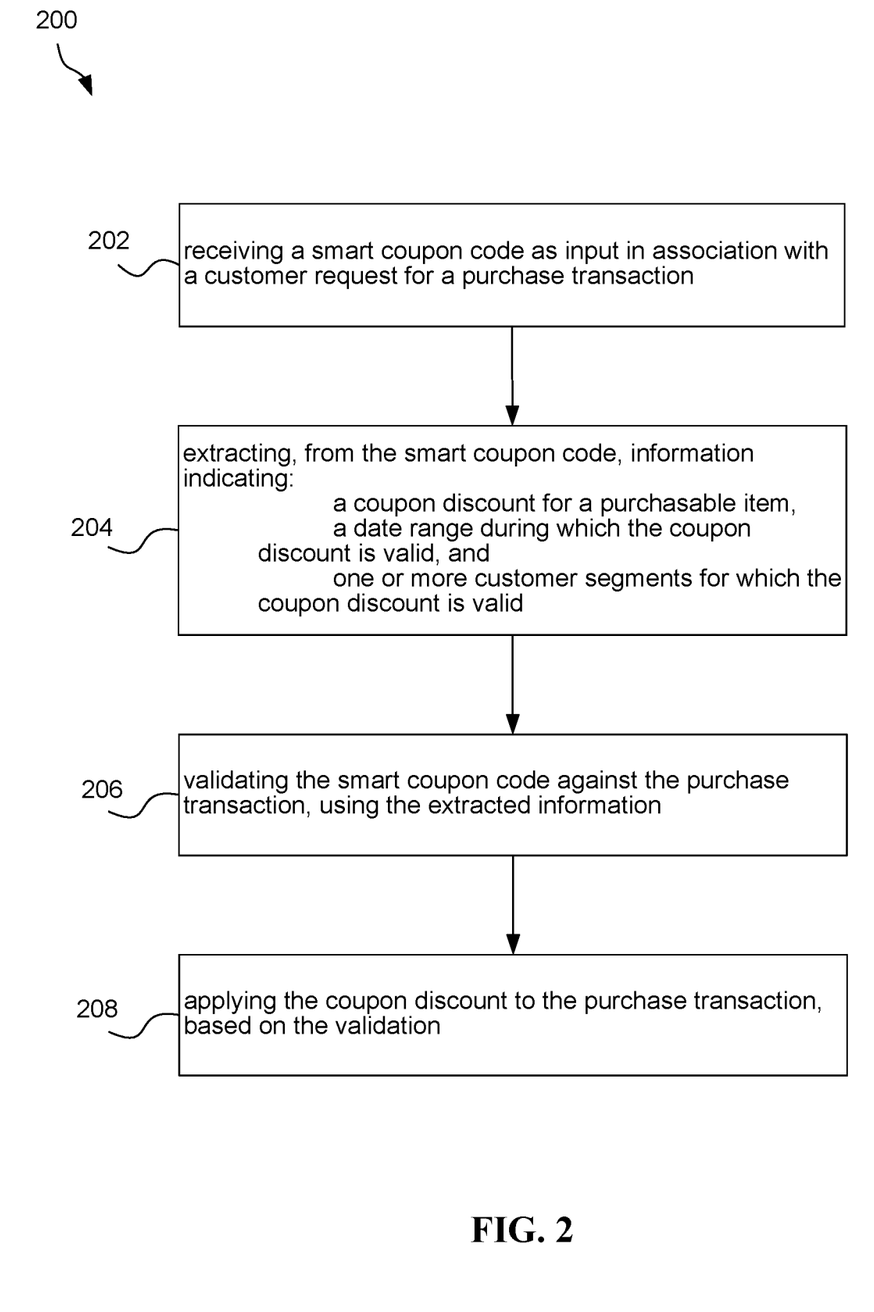
FIG. 2 illustrates a method for processing a smart coupon code, in accordance with an embodiment.

FIG. 2 illustrates a method 200 for processing a smart coupon code, in accordance with an embodiment. The method 200 may be implemented in the context of any computer system, such as the exemplary system 900 of FIG. 9. In an embodiment, the method 200 may be implemented by a computer system processing a purchase transaction, such as a merchant computer system (e.g. server) as described in more detail below. In another embodiment, the method 200 may be performed as part of an eCommerce purchase flow of an eCommerce website.

In operation 202, a smart coupon code is received as input in association with a customer request for a purchase transaction. The smart coupon code may have been generated in accordance with the method 100 of FIG. 1, for example. In any case, the smart coupon includes an indication of a coupon discount for a purchasable item, a date range during which the coupon discount is valid, and one or more customer segments for which the coupon discount is valid, as described above with respect to method 100 of FIG. 1 and the reasons for which will be evident from the description below.

As noted, the smart coupon code is received as input in association with a customer request for a purchase transaction. The customer request for a purchase transaction may be any customer request to purchase a product and/or service. Accordingly, the smart coupon code may be received in association with the customer request for the purpose of applying the coupon discount to the product and/or service requested to be purchased.

In one embodiment, the customer request may be made through an eCommerce purchase flow of an eCommerce website. In this context, the smart coupon code may be received via input provided by the customer during the eCommerce purchase flow. Of course, however, the smart coupon code may be received through any graphical user interface (GUI) configured to receive the smart coupon code as input. Optionally, the smart coupon code may be manually entered by the customer, selected by the customer from a displayed icon or other indicator, verbally provided to a retailer and input by the retailer, etc.

In operation 204, information is extracted from the smart coupon code, the information indicating the coupon discount for the purchasable item, the date range during which the coupon discount is valid, and the one or more customer segments for which the coupon discount is valid. In one embodiment, the information may include the coupon discount for the purchasable item, the date range during which the coupon discount is valid, and the one or more customer segments for which the coupon discount is valid. In another embodiment, the information may include an index, pointer, etc. to the coupon discount for the purchasable item, the date range during which the coupon discount is valid, and the one or more customer segments for which the coupon discount is valid. In still yet another embodiment, the information may include a transformed version of the coupon discount for the purchasable item, the date range during which the coupon discount is valid, and the one or more customer segments for which the coupon discount is valid, including for example a hash value for the one or more customer segments, offset and reference values for the date range, and an alphanumeric code for the coupon discount. In any case, the information is usable to determine the coupon discount for the purchasable item, the date range during which the coupon discount is valid, and the one or more customer segments for which the coupon discount is valid.

In one embodiment, the information may be extracted by parsing the smart coupon code into the information. In yet another embodiment, the information may be extracted by decrypting the smart coupon code to determine the information. The decryption may be provided using a decryption key resulting from a symmetric or asymmetric encryption process performed between the computer system that generated the smart coupon code and the computer system performing the current method 200.

In operation 206, the smart coupon code is validated against the purchase transaction, using the extracted information. In the context of the present description, the validity of the smart coupon code with respect to the purchase transaction refers to the applicability of the coupon discount to the purchase transaction, as determined based on the extracted information. Thus, if the information extracted from the smart coupon code indicates that the coupon discount is applicable to the purchase transaction, then the smart coupon code is determined to be valid for the purchase transaction. On the other hand, if the information extracted from the smart coupon code indicates that the coupon discount is not applicable to the purchase transaction, then the smart coupon code is determined to be invalid for the purchase transaction. By determining the validity of the smart coupon code with respect to the purchase transaction refers based on the information extracted from the smart coupon code, calls to a backend database to validate the smart coupon code may be avoided. All of the information needed to validate the smart coupon code against the purchase transaction may be retrieved from the smart coupon code itself.

In one embodiment, validating the smart coupon code against the purchase transaction, using the extracted information, includes identifying customer data for the customer and identifying a date of the customer request for the purchase transaction. The customer data may be identified from the purchase transaction, from an account of the customer with the eCommerce website, or in any other desired manner. Similarly, the date of the customer request may be identified from the purchase transaction.

Further to this embodiment, the smart coupon code is determined to be valid for the purchase transaction when the customer data matches one or more portions of the one or more customer segments indicated by the extracted information and the date of the customer request for the purchase transaction is within the date range indicated by the extracted information, and the smart coupon code is determined to not be valid for the purchase transaction when the customer data does not match the one or more portions of the one or more customer segments or when the date of the customer request for the purchase transaction is not within the date range.

In operation 208, the coupon discount is applied to the purchase transaction, based on the validation. In particular, the coupon discount may be applied to the purchase transaction when the smart coupon code is determined to be valid for the purchase transaction. Applying the coupon discount to the purchase transaction may include providing the coupon discount prior to completing, or in combination with completing, the purchase transaction. For example, for a monetary coupon discount, a purchase price of the purchase transaction may be reduced by the coupon discount and the customer may be charged the reduced purchase price.

On the other hand, the coupon discount may be prevented from being applied to the purchase transaction when the smart coupon code is determined to be invalid for the purchase transaction. For example, the smart coupon code may be denied for the purchase transaction. In one embodiment, the customer may be notified (e.g. during the eCommerce flow) that the smart coupon code is denied. This way, the customer may be provided options to input a new smart coupon code for processing according to method 200, to allow the purchase transaction to be completed without the coupon discount, or to cancel the purchase transaction, and the user may select from any of these options.

As a further optional option to the method 200, after the purchase transaction is completed, the smart coupon code may be saved with the purchase transaction in a data repository. This correlation in the data repository may be used for reconciliation and/or reporting purposes.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

The embodiment described below allow an eCommerce marketer to select customer segments to be targeted by a smart coupon code. The marketer further decides the date boundaries between which the smart coupon code is valid and the coupon value of the smart coupon code. The building blocks—customer segment, date range of coupon validity and the coupon value—undergoes individual transformation. All this is combined in a predefined format, on which an encryption—symmetric or asymmetric—can be performed. The encrypted, or non-encrypted, output of the transformed building blocks forms the smart coupon code. The smartness of the coupon comes from its data that intrinsically includes the target segment for which it is meant, the validity period and the coupon value. The smart coupon code can be distributed freely, including to customer segments for which it is not meant to per se. However, on application, the smart coupon code gets applied only to the target segment defined therein, subject to the date range validation, for which it was meant.

An eCommerce business that promotes sales using coupons needs agility in the coupon code generation process. This agility is provided using the smart coupon code embodiments described herein. Further, use of the smart coupon code improves performance of the eCommerce purchase transaction, where all incremental improvements contributes to the speed of the eCommerce website. The agility and performance forms the guiding principle of embodiments described below, wherein a smart coupon code is generated, that can be programmatically validated, without any database validation, for a customer segment to decide the coupon amount applicability.

Figure 3:
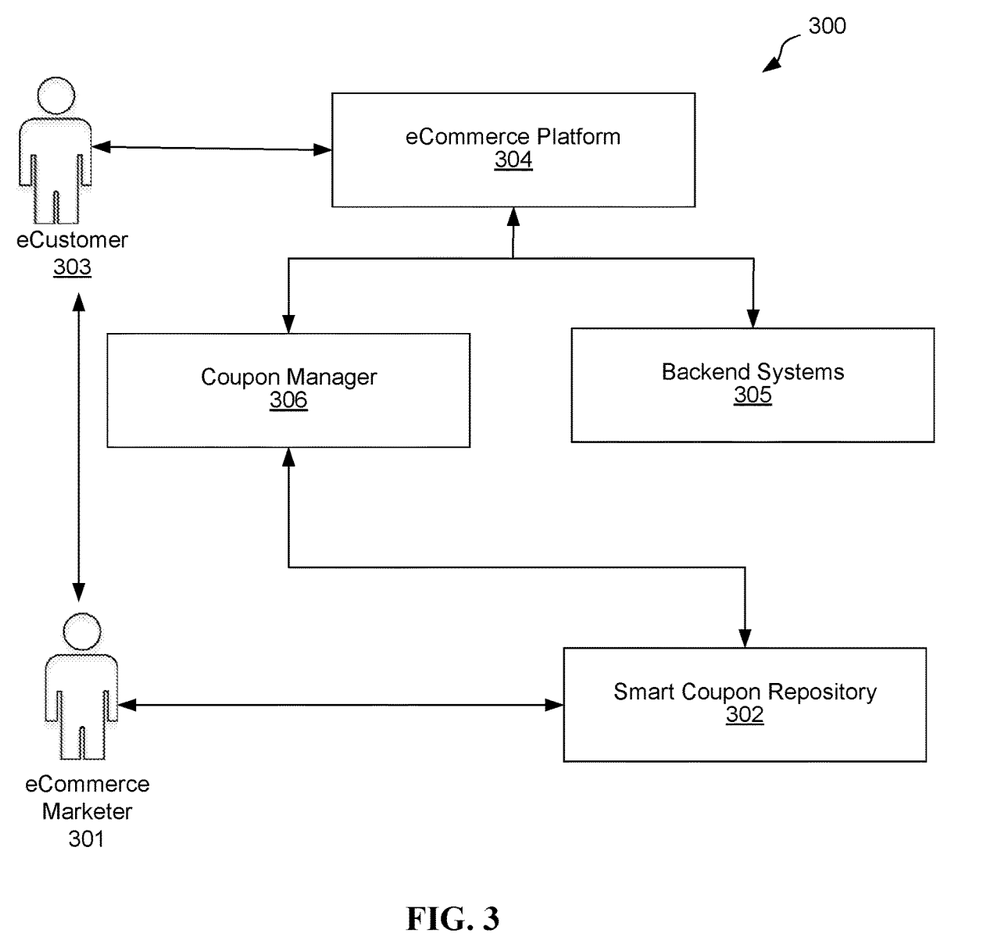
FIG. 3 shows a smart coupon code system, in accordance with an embodiment.

FIG. 3 shows a smart coupon code system 300, in accordance with an embodiment. The smart coupon code system 300 may carry out the methods 100, 200 of FIGS. 1 and 2 respectively.

As shown, the smart coupon code system 300 includes an eCommerce Marketer 301 responsible for defining the building block elements for the smart coupon code, including the customer segment, date range and coupon value, and further defining the mapping between the building blocks for smart coupon code generation.

Coupon Repository 302 contains the building block elements and their relationships. It can be a file based system or a database system—Structured Query Language (SQL) or not only SQL (NoSQL).

eCommerce customer 303 requests a purchase transaction with a smart coupon code, through an eCommerce flow of an eCommerce Platform 304. The eCommerce flow is provided through an eCommerce website which has a coupon section where the customer 303 can key-in the smart coupon code. If the coupon is found to be valid, the coupon discount amount is discounted from the actual cost of the eCommerce cart.

The Backend Systems 305 refer to all southbound systems which the eCommerce website would interact with, such as Inventory system(s), Shipment system(s), Billing system(s), etc.

The Coupon Manager 306 is a system that provides the "Smart Coupon Code Generation" functionalities described herein (e.g. FIG. 1) and the "Smart Coupon Code Consumption" functionalities described herein (e.g. FIG. 2).

In an exemplary flow of smart coupon code system 300, eCommerce Marketer 301 provides as input to Smart Coupon Repository 302 for generating a particular smart coupon code. The input includes building block elements for the smart coupon code, including one or more customer segments, a date range and a coupon value. By providing the input for generating a particular smart coupon code, the input building block elements are mapped to (associated with) one another in the Smart Coupon Repository 302.

Next, Coupon Manager 306 identifies the building block elements for the smart coupon code from the Smart Coupon Repository 302 and generates the smart coupon code. In some way, the smart coupon code can then be distributed to the eCommerce customer 303. To use the smart coupon code, customer 303 inputs to the eCommerce Platform 304 during an eCommerce flow a request for a purchase transaction with the smart coupon code.

eCommerce Platform 304 uses Coupon Manager 306, which may or may not be a component of eCommerce Platform 304, as part of the eCommerce flow to validate the smart coupon code against the purchase transaction. The eCommerce Platform 304 processes the purchase transaction based on the validation of the smart coupon code.

FIG. 4 shows method 400 for generating a smart coupon code, in accordance with the smart coupon code system of FIG. 3. In one embodiment, the method 400 may be performed as the above described "Smart Coupon Code Generation" by Coupon Manager 306 of FIG. 3.

In operations 401, 402, and 403, building blocks for a smart coupon code are retrieved (e.g. from Smart Coupon Repository 302). The building blocks may have been defined by eCommerce Marketer 301. In any case, in operations 401, 402, and 403, the retrieved building blocks include, respectively, a customer segment, date range, and coupon discount (i.e. coupon value). The building blocks may be retrieved in any order, as desired.

As shown in operation 401, customer segment (S) is modeled (e.g. in Smart Coupon Repository 302) as S={v1, v2, v3 ... vn} where v1, v2 ... vn make up an element set and each correspond with individual elements of the customer segment (i.e. segment attributes). Any number of different customer segments (S) can be defined (1 to m as shown).

A customer segment (S) from an eCommerce business standpoint has many attributes or elements. For instance, an attribute can be customer type which in turn can have many values like public, corporate, government, staff, student etc.; another attribute can be a buyer that can be buyer, returning, etc. A list of such attributes would form the customer segment. The list of attributes is a business defined call and can potentially have many attributes. Each segment attribute has a possible catch-all ("ALL") value other than the list of other defined values. The semantics of the All value is that it covers each attribute value defined for the segment attribute, which also includes a NULL (meaning it was not specified).

A segment definition (defined customer segment) includes the defined values of individual attributes. The segment definition would be the list of all attributes that make up the segment. The values of the attributes would be taken from the list of configured values of each attribute. A segment definition with a value of some segment attribute embodiment can be the catch-all ('All') variable. In such a case, it becomes a case of a partial segment where it has a discrete value of segment attributes but also has a variable catch-all attribute.

In operation 402, date range (D) is modeled (e.g. in Smart Coupon Repository 302) as D={S,E} where S=start date time and E=end date time. Again, any number of date ranges (D) can be defined (1 to n as shown).

In operation 403, coupon discount (CV) is modeled (e.g. in Smart Coupon Repository 302) as CV={voucher amount} and includes a combination of discount type and discount value. The discount type can be fixed, percentage or tiered. The discount value is a numerical value. Based on the definition of the discount type, the effect of discount value is triggered when the smart coupon code is applied to a purchase transaction. A fixed or a flat discount would discount a flat amount of value in the eCommerce cart, whereas a percentage discount type would reduce the numerical percentage value from the cart. Any number of coupon discounts (CV) can be defined (1 to p as shown).

In operation 404, a mapping process is performed to map a combination (M) of: a defined customer segment (S), a defined date range (D), and a defined coupon discount (CV). The mapping may be performed based on mapping information provided in the Smart Coupon Repository 302, which may have been defined by the eCommerce Marketer 301. Any number of different combinations (M) can be mapped (1 to Z as shown).

This mapping presents many possibilities. A customer segment can have different date ranges on the same coupon value, different segments on the same date range on the same or different coupon value, etc. This mapping provides a needed flexibility to the business marketer to craft a smart coupon. The mapping definition has other placeholders, one of which is coupon code that is EMPTY until the generation algorithm is executed in operation 405.

In operation 405, a smart coupon code algorithm is generated (e.g. instantiated) for a first combination $M^1$, which is then executed to perform operations 406-409.

In operation 406, a hash of the customer segment (S) in combination $M^1$ is generated. The hash of the customer segment (S) may be a fixed length alphanumeric code (SC).

In operation 407, the date range (D) in combination $M^1$ is transformed to a combination of a start date and offset (DC) format which can be used to decode the end date.

In operation 408, the coupon discount (CV) in combination $M^1$ is transformed to a combination of a discount type (e.g. percentage, fixed, etc.) and a discount value (TV).

In operation 409, the smart coupon code is generated from the output of operations 406-408. As shown, the smart coupon code is generated by encrypting the combination of: SC, DC, and TV, using an encryption key. Of course, in another embodiment, the smart coupon code may be generated without the encrypting, and instead may simply include the combination of: SC, DC, and TV. The method 400 returns to operation 405 for a next combination $M^2$, and proceeds accordingly until all combinations (M) have been generated into smart coupon codes.

In an exemplary embodiment, a smart coupon code field as EMPTY is chosen in operation 405, but there can be many other embodiments that can indicate the need to generate coupons. The generation algorithm runs on a loop to generate the smart coupons. It in turn requests the different building blocks to generate their own format as explained above. For instance, the Customer segment is processed differently compared to the date range processing. After the individual block processing, operation 409 would run to encrypt the combination of building blocks, thus forming the smart coupon code.

Figure 5:
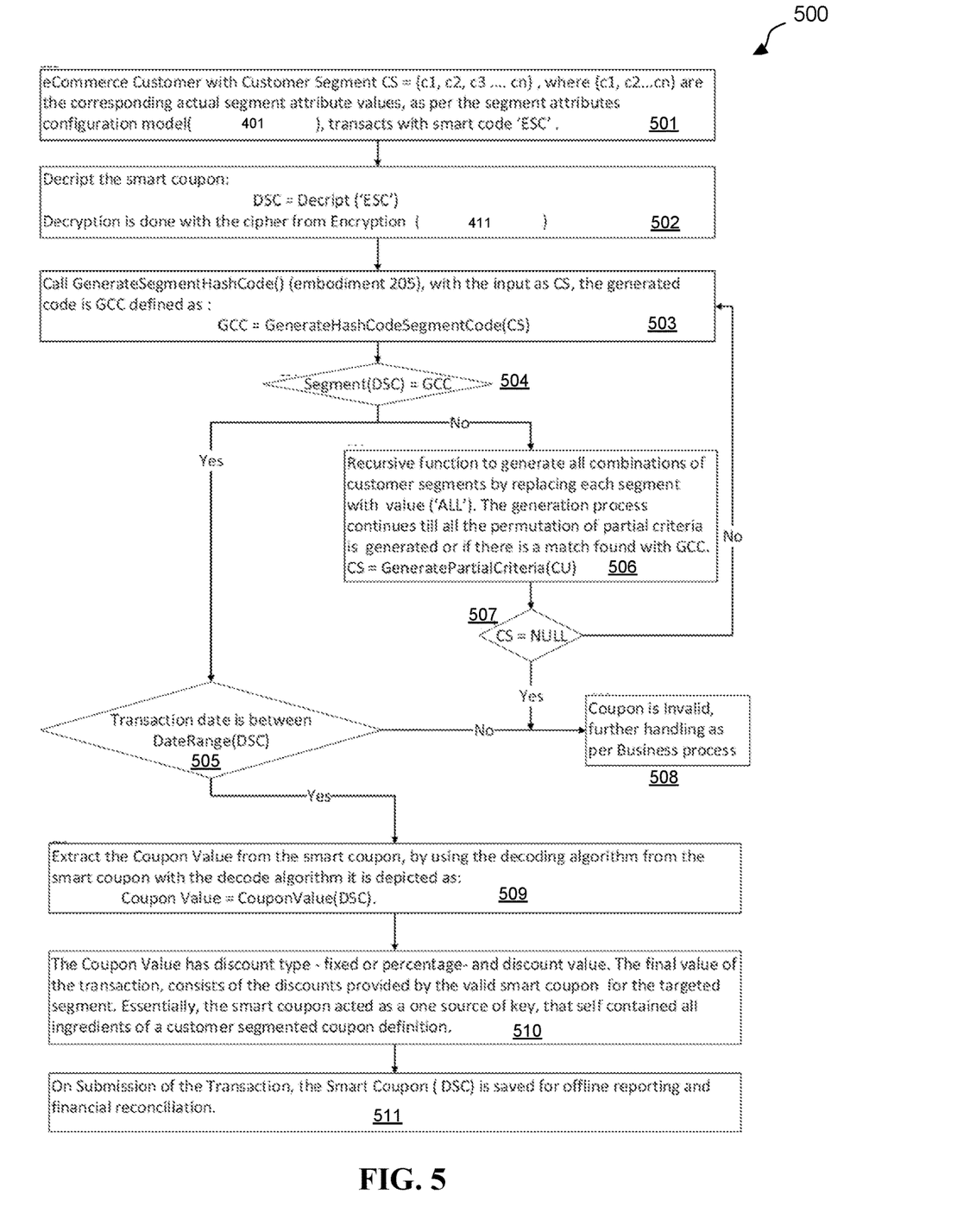
FIG. 5 shows a method for processing a smart coupon code, in accordance with the smart coupon code system of FIG. 3.

FIG. 5 shows a method 500 for processing a smart coupon code, in accordance with the smart coupon code system of FIG. 3. In one embodiment, the method 500 may be performed as the above described "Smart Coupon Code Consumption" by Coupon Manager 306 of FIG. 3.

In operation 501, an eCommerce customer transacts with a smart coupon code (i.e. requests a purchase transaction with the smart coupon code). As a part of the eCommerce flow, customer segment attributes are associated to the actual customer based on an eCommerce identity and authentication process. The encrypted smart coupon code, along with the customer segment attributes, are used for further processing to decide the applicability of the coupon discount.

In operation 502, the encrypted smart coupon code is decrypted into its plain text form by using the corresponding decryption key for encryption key used in operation 409. The smart coupon code referred to in operations 503-511 uses the plain text form of the smart coupon code to advance the processing logic.

In operation 503, a hash code is generated for the customer segment attributes. To do so, the algorithm of operation 405 is used. This ensures that the hash code is generated consistently as was done during the coupon generation process as per operation 405.

In operation 504, the hash code of customer segment in the smart coupon code is compared to the hash code generated in operation 503. If the comparison yields an equal result, then further date range processing is done as explained in operation 505, else partial segment hash code generation is done as explained in operation 506.

Operation 505 exemplifies the process to ascertain the smart coupon code validity from a date range perspective. As per the smart coupon code format, the date range is stored as start date and offset as explained in operation 407. The end date is derived as an addition of start date and offset. If the purchase transaction date lies between the start date and end date, further processing is performed by operation 509; else, date range failure processing is performed though operation 506.

Operation 506 exemplifies generating all the partial segments by using some segment attributes with actual customer segment attributes as procured from operation 501, while the rest of the segment attributes are replaced with a catch-all attribute "ALL". This is performed to have all different permutations of partial segment. Each partial segment generated is advanced to operation 507. The generation of partial segments is performed until all the customer segment attributes has a catch-all "ALL" value. This is a scenario where a smart coupon code is valid for the entire segment. If all the permutations are generated then the value of the customer partial segment is NULL, which is advanced to operation 507.

Operation 507 exemplifies a check to ascertain if the partial segment generated in operation 506 is exhausted. If all the permutations of the partial segments are generated then operation 506 would indicate this by sending a NULL value (it's a void value). A not NULL value would represent a valid partial segment. If the partial segment is not NULL, the processing is advanced to operation 503 for further processing, else on a NULL partial segment the processing is advanced to operation 508.

Operation 508 exemplifies a scenarios where the smart coupon code is invalid. The first scenario occurs through operation 505 which would imply that the eCommerce customer is indeed meant to use the coupon (customer attributes match), but the date range is a not valid. The second scenario occurs through operation 507, which means the smart coupon code is not meant for the current eCommerce customer, or that the smart coupon code was spurious.

Operation 509 is processed only if the Date Range validation of operation 505 is successful. The primary essence of operation 509 is to extract the coupon value from the smart coupon code. After extraction, the further processing is advanced to operation 510.

In operation 510, the coupon value is decomposed into discount type—fixed, percentage or other type—and discount value. Based on the discount type and discount value, the eCommerce transaction is processed to reflect the discount that was foreseen from the smart coupon code.

Operation 511 exemplifies the process where the eCommerce purchase transaction is successful. As a part of saving the purchase transaction data in a persistent store, the smart coupon code is also saved. This can be used for later auditing and financial reporting. Throughout the transaction process, the database or any hardcodes mechanism is not used to validate and apply the smart coupon code amount. The "smart coupon code acts as a single source of information that, although contains very sensitive information, can be publicly distributed. The capability of this smartness can be used to promote sales on a targeted customer segment, cross customer segments, and also promoting customer behavioral changes and hence changing customer segments.

Figure 6:
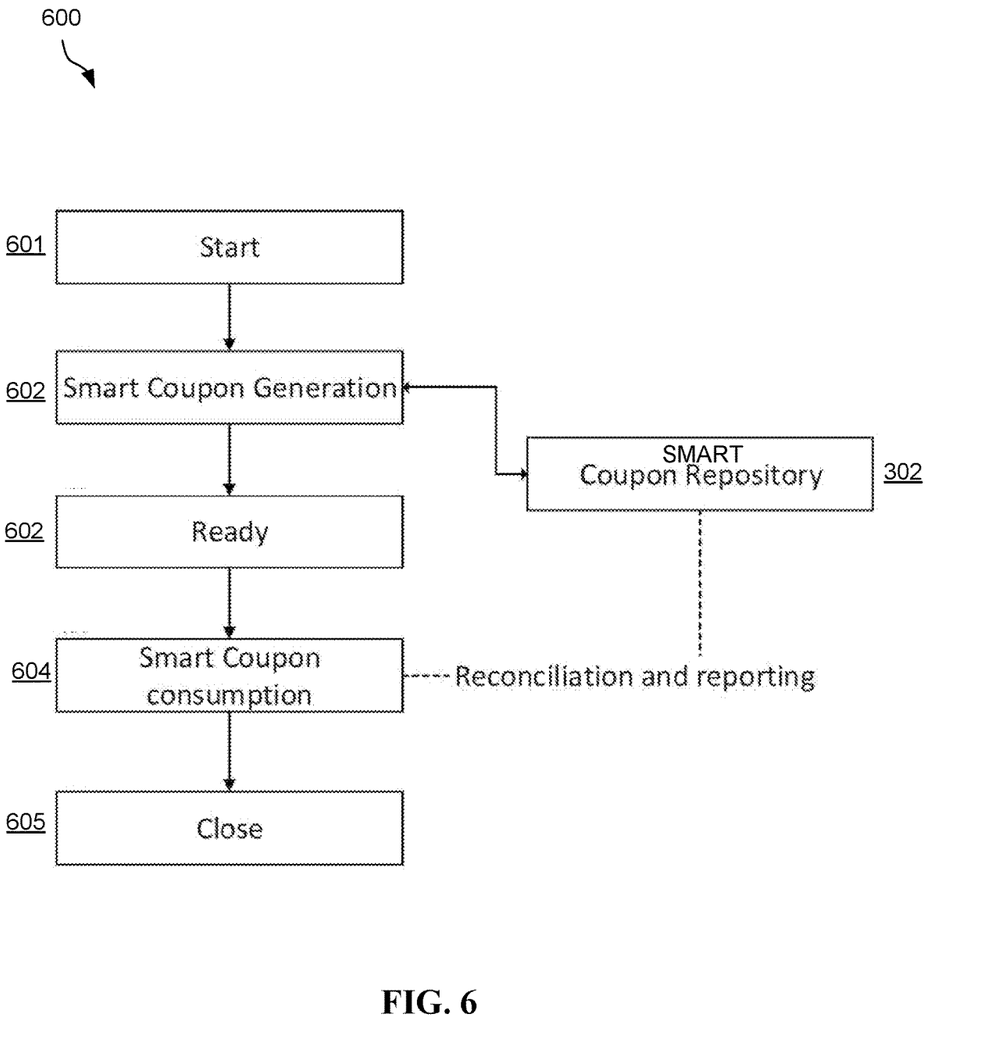
FIG. 6 shows a life-cycle a smart coupon code, in accordance with an embodiment.

FIG. 6 shows a life-cycle 600 a smart coupon code, in accordance with an embodiment.

Operation 601 exemplifies the start of the process of smart coupon code generation. At this stage, the different building block definitions as was described from embodiment 401 to 404 is performed.

Operation 602, exemplifies the smart coupon generation process. The encrypted smart coupon code configuration is updated in the Smart coupon repository 302 after the successful processing from embodiment 405-409.

Operation 603 exemplifies that the system is ready to accept the smart coupon code after the processing of embodiment 602.

Operation 604 exemplifies an eCommerce transaction wherein the customer requests a purchase transaction using smart coupon code. All the processes as was explained as a part of operations 501-511 are processed. The eCommerce transaction along with the existing business data also persists with the smart coupon code. The smart coupon code, so persisted, can then be audited and reconciled with usage patterns for further business intelligence gathering.

Operation 605 exemplifies the process where the Coupon Manager 306 is stopped, e.g. for software maintenance or enhancements.

Figure 7:
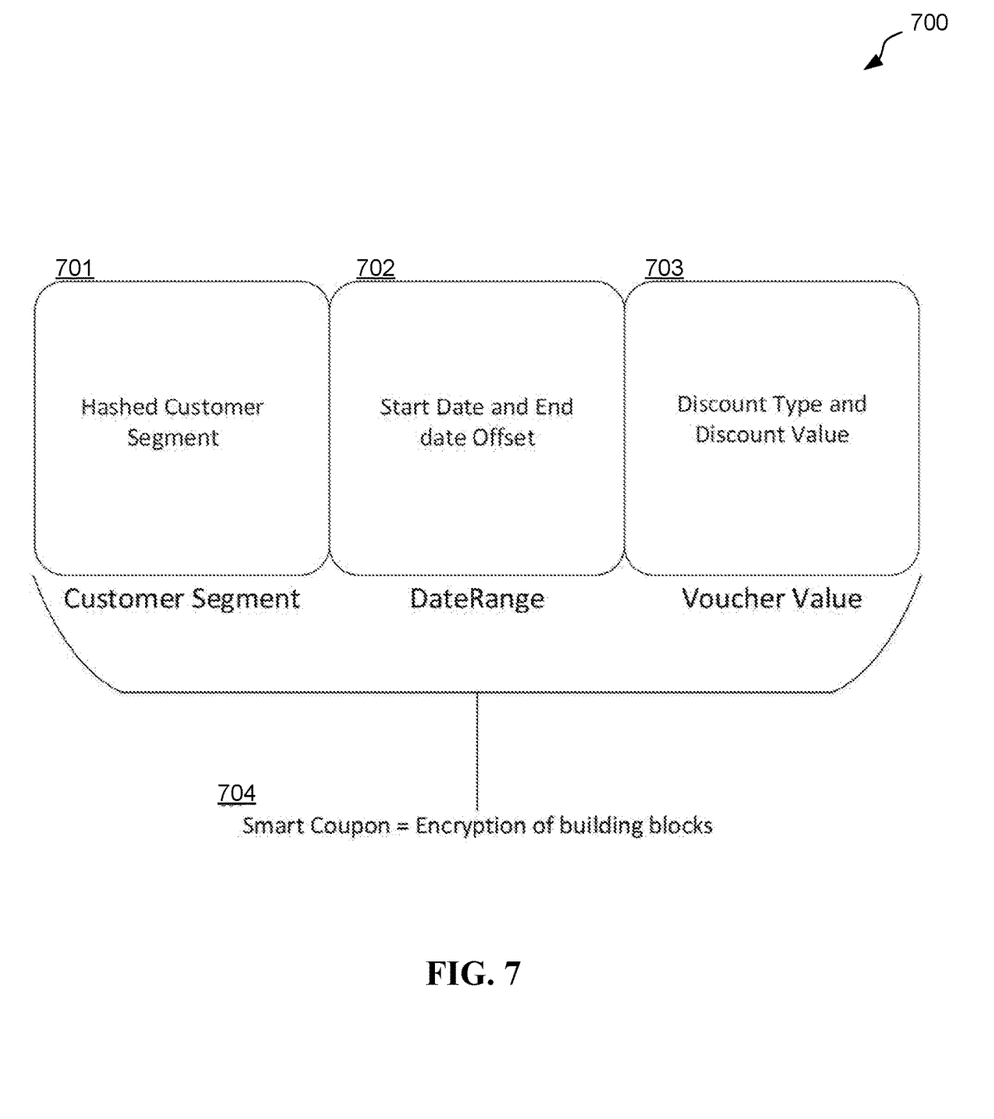
FIG. 7 shows a data format for a smart coupon code, in accordance with an embodiment.

FIG. 7 shows a data format 700 for a smart coupon code, in accordance with an embodiment.

The smart coupon code is an alphanumeric encrypted string. The string can have any kind of size to fit in the building blocks. As an example embodiment, a smart coupon code would have 14 characters, which internally in the processer can be depicted as 7 bytes (7*8=56 bits). The various building blocks can be sized accordingly with this example smart coupon code embodiment size. The 7 bytes on the example embodiment is distributed as 2 bytes for the hashed customer segment 701, 3 bytes for the start data and offset 702, and 2 bytes for the discount type and discount value 703. However, there is no restriction to the size of the overall format, which would in turn imply to align the different participating build block sizes accordingly.

Part 701 exemplifies the customer segment hash code. It can consume 2 bytes out of the 7 bytes from the above example embodiment size. In 2 bytes, 65536 (2^16) unique segments can be stored. Each segment itself has a unique set of values for the attributes defining the customer segment.

Part 702 exemplifies the date range format "OODDM-MYY", here OO is offset DDMMYY is the date. 3 bytes as per the above example embodiment can be used to present this. One byte can present the Offset (OO), which would mean that if the example embodiment sizing was used, a coupon can be valid for 256 days from the start date. The remaining two bytes can present the date "DDMMYY". The distribution can be 5 bits for Days (DD) that can represent all 31 days of a month, 4 bits for month (MM) that can present all the 12 months, and the remaining 7 bits for year (YY) that can easily make the coupon valid till this century 2099 (represented as YY would be 99).

Part 703 exemplifies the smart coupon value field. It consumes the remaining 2 bytes (2*8=16 bits) to present the discount type and discount value. Here, 4 bits may be used to present 16 different types of coupon, each of the different numbers represent a discount type—the example embodiment was fixed and percentage. The remaining 12 bits can be used to represent a discount value. This would imply for a fixed discount type, a maximum coupon discount can be 4096 in actual currency. There can be more allocation of bytes should there be an eCommerce business need for higher discounts.

Part 704 exemplifies the encryption process performed on the plain text smart coupon code. Having all the building blocks as ingredients, symmetric or asymmetric encryption may be used to encrypt the plan text. Based on the chosen encryption type, the key to encrypt may be the same or different. The encryption algorithm exemplified in embodiment 409 would use the key to encrypt. The key remains as a part of the Coupon Manager 306 handling software itself. Based on the chosen encryption type, a decryption process as a part of embodiment 502 would use the same key in case of symmetric encryption as that of the embodiment 409, or would use the corresponding decryption key if embodiment 409 exemplifies asymmetric encryption.

Figure 8:
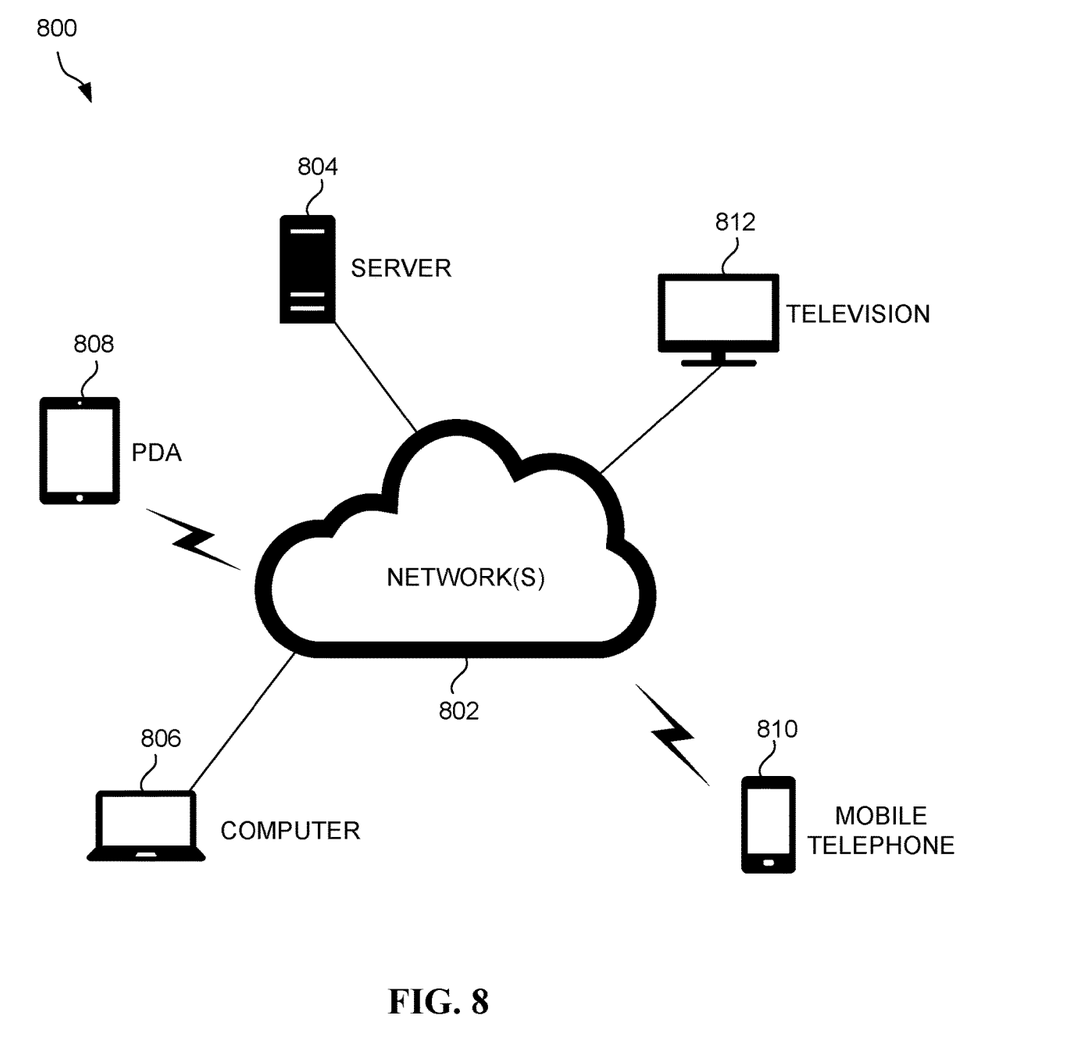
FIG. 8 illustrates a network architecture, in accordance with one possible embodiment.

FIG. 8 illustrates a network architecture 800, in accordance with one possible embodiment. As shown, at least one network 802 is provided. In the context of the present network architecture 800, the network 802 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 802 may be provided.

Coupled to the network 802 is a plurality of devices. For example, a server computer 804 and an end user computer 806 may be coupled to the network 802 for communication purposes. Such end user computer 806 may include a desktop computer, lap-top computer, and/or any other type of logic. Still yet, various other devices may be coupled to the network 802 including a personal digital assistant (PDA) device 808, a mobile phone device 810, a television 812, etc.

Figure 9:
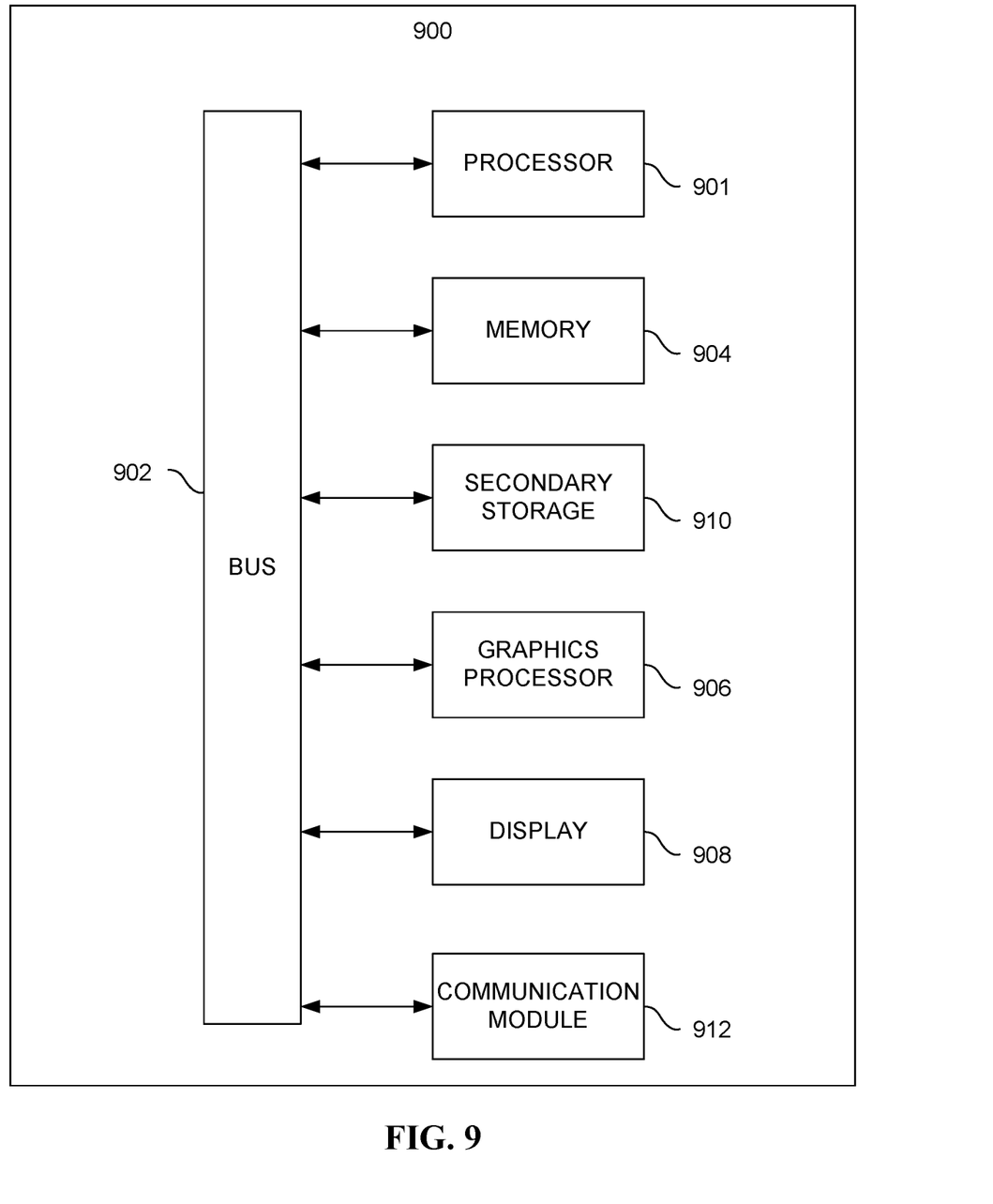
FIG. 9 illustrates an exemplary system, in accordance with one embodiment.

FIG. 9 illustrates an exemplary system 900, in accordance with one embodiment. As an option, the system 900 may be implemented in the context of any of the devices of the network architecture 800 of FIG. 8. Of course, the system 900 may be implemented in any desired environment.

As shown, a system 900 is provided including at least one central processor 901 which is connected to a communication bus 902. The system 900 also includes main memory 904 [e.g. random access memory (RAM), etc.]. The system 900 also includes a graphics processor 906 and a display 908.

The system 900 may also include a secondary storage 910. The secondary storage 910 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 904, the secondary storage 910, and/or any other memory, for that matter. Such computer programs, when executed, enable the system 900 to perform various functions (as set forth above, for example). Memory 904, storage 910 and/or any other storage are possible examples of non-transitory computer-readable media.

The system 900 may also include one or more communication modules 912. The communication module 912 may be operable to facilitate communication between the system 900 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method for generating a smart coupon code, the method comprising:
   receiving as input:
      a coupon discount for a purchasable item,
      a date range during which the coupon discount is valid, and
      one or more customer segments for which the coupon discount is valid;
   modeling the input in a repository including:
      storing, as a modeled coupon discount, the coupon discount in the repository as a combination of a discount type and a discount value,
      storing, as a modeled date range, the date range in the repository as a combination of a start date time and an end date time, and
      storing, as a modeled one or more customer segments, the one or more customer segments in the repository as an element set, wherein each element in the element set represents a different type of customer attribute and wherein, for each element in the element set, a value is provided for the element to define a value for the type of customer attribute;
   mapping, as a particular combination for a smart coupon code, the modeled coupon discount, the modeled date range, and the modeled one or more customer segments;
   generating the smart coupon code, based on the particular combination, by:
      hashing the modeled one or more customer segments into a fixed length alphanumeric code,
      transforming the modeled date range as a combination of a start date and offset format,
      encrypting, using an encryption key, a combination of the fixed length alphanumeric code, the transformed modeled date range, and the modeled coupon discount,
      wherein a result of the encryption is the smart coupon code.

2. The non-transitory computer readable medium of claim 1, wherein the discount type is selected from a percentage amount and a fixed amount.

3. The non-transitory computer readable medium of claim 1, wherein the element set includes elements for:
   customer type, and
   customer location.

4. The non-transitory computer readable medium of claim 1, further comprising:
   receiving the smart coupon code as input in association with a customer request for a purchase transaction;
   extracting, from the smart coupon code, information indicating:
      the coupon discount, the date range during which the coupon discount is valid, and the one or more customer segments for which the coupon discount is valid;

validating the smart coupon code against the purchase transaction, using the extracted information; and applying the coupon discount to the purchase transaction, based on the validation.

5. The non-transitory computer readable medium of claim 4, wherein the validating is performed as part of an eCommerce purchase flow of an eCommerce website.

6. The on-transitory computer readable medium of claim 4, wherein extracting the information includes:

decrypting the smart coupon code to determine the information.

7. The on-transitory computer readable medium of claim 4, wherein validating the smart coupon code against the purchase transaction, using the extracted information, includes:

identifying customer data for the customer, identifying a date of the customer request for the purchase transaction, determining that the smart coupon code is valid for the purchase transaction when the customer data matches one or more portions of the one or more customer segments and the date of the customer request for the purchase transaction is within the date range, and determining that the smart coupon code is not valid for the purchase transaction when the customer data does not match one or more portions of the one or more customer segments or when the date of the customer request for the purchase transaction is not within the date range.

8. The on-transitory computer readable medium of claim 7, wherein the coupon discount is applied to the purchase transaction when the smart coupon code is determined to be valid for the purchase transaction.

9. The on-transitory computer readable medium of claim 4, further comprising:

after the purchase transaction is completed, saving the smart coupon code with the purchase transaction for reconciliation and reporting.

10. A method comprising:

receiving as input:
 a coupon discount for a purchasable item,
 a date range during which the coupon discount is valid, and
 one or more customer segments for which the coupon discount is valid;

modeling the input in a repository including:
 storing, as a modeled coupon discount, the coupon discount in the repository as a combination of a discount type and a discount value,
 storing, as a modeled date range, the date range in the repository as a combination of a start date time and an end date time, and
 storing, as a modeled one or more customer segments, the one or more customer segments in the repository as an element set, wherein each element in the element set represents a different type of customer attribute and wherein, for each element in the element set, a value is provided for the element to define a value for the type of customer attribute;

mapping, as a particular combination for a smart coupon code, the modeled coupon discount, the modeled date range, and the modeled one or more customer segments;

generating the smart coupon code, based on the particular combination, by:
 hashing the modeled one or more customer segments into a fixed length alphanumeric code,
 transforming the modeled date range as a combination of a start date and offset format,
 encrypting, using an encryption key, a combination of the fixed length alphanumeric code, the transformed modeled date range, and the modeled coupon discount,
 wherein a result of the encryption is the smart coupon code.

11. A system, comprising:

a non-transitory memory storing instructions; and one or more processors in communication with the non-transitory memory that execute the instructions to perform a method comprising:

receiving as input:
 a coupon discount for a purchasable item,
 a date range during which the coupon discount is valid, and
 one or more customer segments for which the coupon discount is valid;

modeling the input in a repository including:
 storing, as a modeled coupon discount, the coupon discount in the repository as a combination of a discount type and a discount value,
 storing, as a modeled date range, the date range in the repository as a combination of a start date time and an end date time, and
 storing, as a modeled one or more customer segments, the one or more customer segments in the repository as an element set, wherein each element in the element set represents a different type of customer attribute and wherein, for each element in the element set, a value is provided for the element to define a value for the type of customer attribute;

mapping, as a particular combination for a smart coupon code, the modeled coupon discount, the modeled date range, and the modeled one or more customer segments;

generating the smart coupon code, based on the particular combination, by:
 hashing the modeled one or more customer segments into a fixed length alphanumeric code,
 transforming the modeled date range as a combination of a start date and offset format,
 encrypting, using an encryption key, a combination of the fixed length alphanumeric code, the transformed modeled date range, and the modeled coupon discount,
 wherein a result of the encryption is the smart coupon code.

* * * * *